Figure 1:
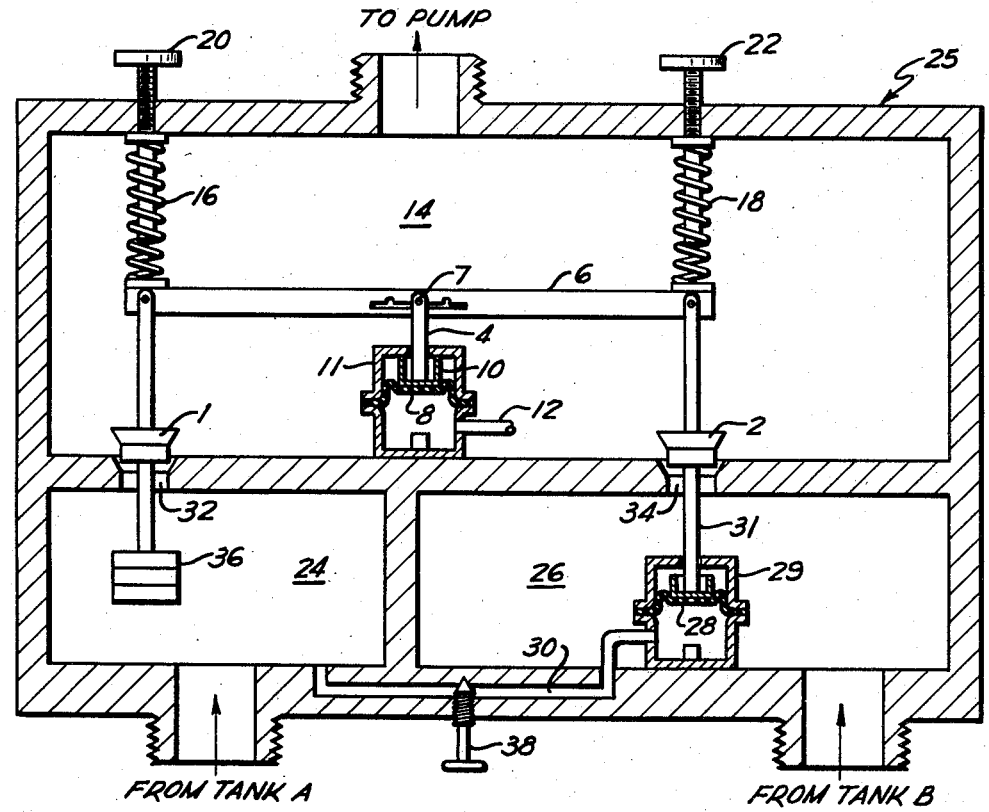

April 28, 1959

G. C. BLEWETT ET AL 2,883,996

FLUID PROPORTIONING APPARATUS

Filed Oct. 11, 1956

INVENTORS
GUY C. BLEWETT
WILLIAM K. McCOY
BRUCE R. WALSH
BY

THEIR ATTORNEY

United States Patent Office 2,883,996
Patented Apr. 28, 1959

2,883,996

FLUID PROPORTIONING APPARATUS

Guy C. Blewett, Verona, William K. McCoy, Fox Chapel, and Bruce R. Walsh, Wilkinsburg, Pa., assignors to Gulf Oil Corporation, Pittsburgh, Pa., a corporation of Pennsylvania Application October 11, 1956, Serial No. 615,281

8 Claims. (Cl. 137—100)

This invention relates to a fluid proportioning means and more particularly to a proportioning valve means that has a plurality of inlets and a single outlet and that is adapted to maintain a constant proportion between component blending fluids, notwithstanding variation in the relative pressure differentials between the inlets and the outlets of said valve means.

In causing a plurality of fluids to flow from separate sources and to be mixed in a fixed proportion controlled by adjustment of orifices in the respective supply lines, difficulty is ordinarily encountered in maintaining a constant proportion of the component fluids in the mixture, where the pressure differentials across the aforesaid orifices vary independently. Thus, although the orifice areas in the respective supply lines connected to two sources of liquid supply may be originally adjusted to permit flow of a predetermined, fixed proportion of the respective liquids, the proportion of flow through the respective inlet orifices will not always be the same as originally obtained, if, for example, the relative liquid levels in the supply tanks, or any other factor affecting the relative pressure differentials across the orifices, subsequently varies from that existing at the time of original adjustment of the orifice area.

A situation of the foregoing kind can arise when, for example, a higher and a lower octane gasoline are pumped and blended in a fixed proportion from two separate sources of supply that are disposed at a lower elevation than the pump, and when each of the supply sources is also independently pumped from. Should one of the component gasolines be pumped independently in unblended form at a different rate from that at which the other is pumped, the liquid levels in the respective supply tanks, and thus the pressure differentials across the proportion controlling orifices, will vary independently. When the pressure differential across one proportion controlling orifice varies relative to that across the other, the proportion of the liquids flowing through the orifices will also vary, unless the size of the orifices is adjusted to compensate for the variation in pressure differential. The problem of independent variation in the pressure differentials across the proportion controlling orifices can also arise in other ways, as will appear hereinafter.

The herein disclosed invention relates to apparatus adapted to permit flowing of fluids in a predetermined, fixed proportion from separate sources without regard to independent variation in the pressure differentials across variable orifices by which the proportions are controlled. In a broad sense the herein disclosed apparatus comprises a valve housing containing a mixing compartment and a first and second inlet compartment connected to the mixing compartment. First and second valve means are provided for controlling flow from the respective inlet compartments into said mixing compartment. There is further provided means responsive to fluid pressure differential between the mixing compartment and an external fluid pressure source for concurrently opening the valve means when flow through the apparatus is commenced and for concurrently closing the valve means when flow is stopped. The invention also includes linking means connecting the first and second valve means and adapted to produce concurrent and opposite opening and closing movement of said valve means. The invention further includes a conduit connecting one of said inlet compartments with pressure responsive means connected with the valve means associated with the other of said inlet compartments, said pressure responsive means being responsive to pressure differential between said first and second inlet compartments and adapted to adjust the valve means so as to vary flow from the respective inlet compartments through each of said valve means inversely with the direction of the pressure differential.

As will be seen from the detailed description below, the above-described proportioning valve means functions automatically in response to variation in the relative pressure differentials between the inlet compartments to adjust the orifice size of the valve ports to deliver the component fluids in a fixed proportion. At the same time the herein described novel valve means functions as automatic check valve means permitting unidirectional flow of fluid in the respective supply lines.

Figure 2:
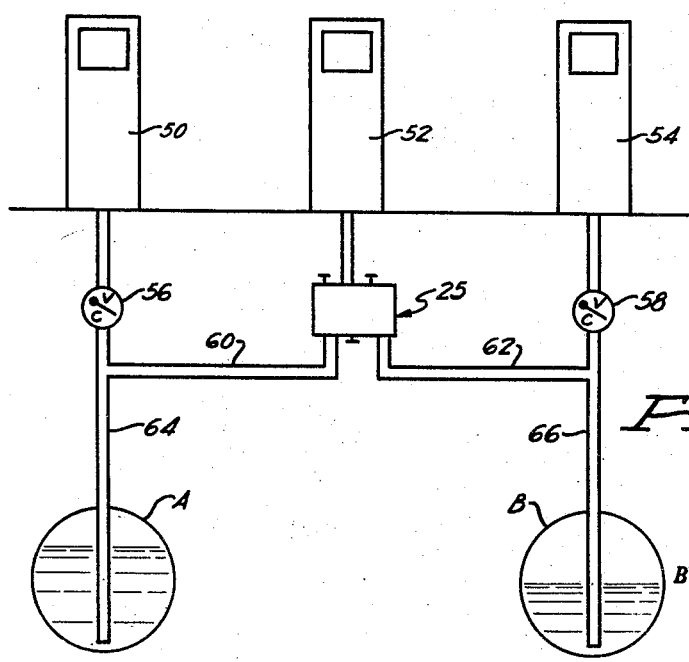

Referring briefly to the attached drawings there is shown schematically in Figure 1 a side elevation, partly in section, of a preferred modification of the herein described proportioning valve means. In Figure 2 there is shown a schematic representation, partly in section, of a fluid dispensing system in which one embodiment of the herein described proportioning valve means can be used to advantage.

Referring now to Figure 1 in greater detail, numeral 14 refers to the mixing compartment while numerals 24 and 26 denote respectively the first and second inlet compartments, all of which are contained within valve housing 25. The threaded nipple at the top of compartment 14 constitutes the outlet, or discharge port, for the mixing compartment, while the threaded nipples located at the bottom of inlet compartments 24 and 26 form the inlet ports for the latter. Numerals 1 and 2 denote valve members adapted to engage valve ports 32 and 34 that connect respectively compartments 24 and 14, and 26 and 14. Valve members 1 and 2 are adapted to control flow of fluid from inlet compartments 24 and 26 to mixing compartment 14. Valve members 1 and 2 together with valve ports 32 and 34 form the first and second valve means referred to herein. Numeral 6 denotes a lever pivotally connected with the valve stems of valve members 1 and 2. Lever 6 constitutes linking means adapted to produce concurrent movement in opposite directions of the respective valve means. Lever 6 is pivotally supported upon fulcrum 7 which is connected through piston rod 4 to the upper side of the diaphragm of a first diaphragm actuator 11. Numeral 12 denotes a vent connecting the atmosphere (or other suitable external fluid pressure source) and the lower side of diaphragm actuator 11, whereby the means 11 is made responsive to pressure differential between the atmosphere and the mixing compartment. Numerals 16 and 18 designate resilient spring members bearing upon the valve members 1 and 2 through the valve stems associated therewith. Numerals 20 and 22 denote threaded screw means for adjusting the resilient force of spring members 16 and 18. Elements 16, 18, 20 and 22 together comprise means for adjusting the valve means and flow therethrough. Numeral 31 refers to a piston rod associated at one end with valve member 2 and at the other end with the upper side of a diaphragm actuator 29. The lower side of diaphragm actuator 29 is connected to inlet compartment 24 through conduit 30, whereby means 29 is made responsive to pressure differential between the inlet compartments 24 and 26. Numeral 36 denotes a counterweight. Numeral 38 refers to a manually operated valve for damping fluid flow between compartment 24 and the lower chamber of actuator 29.

In operation, assuming for illustration that it is desired to pump a blend of two component liquids in a fixed, predetermined proportion, the valve means is first preset to deliver the desired liquid proportion. Presetting is accomplished by adjustment of one or both of threaded members 20 and 22 and/or by lateral displacement of fulcrum 7 along the notched slot in lever 6. Assuming a 1:1 volume ratio is desired, presetting is accomplished by balancing the spring tension to permit the valve members to open to the same degree.

As the pressure downstream of mixing compartment 14 is reduced by means of a pump, not shown, liquid tends to flow from mixing compartment 14 toward the pump, thus reducing the pressure within mixing compartment 14. The reduced pressure in mixing compartment 14 permits piston rod 4 and fulcrum 7 to rise under the force of atmospheric pressure, or other suitable external fluid pressure source, operating through vent 12 on the underside of diaphragm 8. The differential between the external fluid pressure source and the fluid pressure in the mixing compartment during flow through the device is in excess of the pressure differentials between the inlet compartments and the mixing compartment, in order that the first mentioned differential will take precedence. By causing the valve means to open under a force other than the pressure differential across the valve ports, we avoid substantially enlarging the possibility of cavitation in any system into which the proportioning means is incorporated.

Parenthetically, it may be noted that the area of diaphragm 8 is such that, when acted on by pressure differentials of the magnitude encountered in this portion of the system, the diaphragm will be capable of producing a force sufficient to effect the movement desired. Obviously, the diaphragm area can vary from system to system.

The upward motion of piston rod 4 carries with it pivotally supported lever 6 and the valve members 1 and 2 attached to opposite ends thereof. In the embodiment illustrated, the upward travel of piston rod 4 is limited by contact of piston 10 with the housing of diaphragm actuator 11. However, other means of limiting travel can be used. The upward travel of piston rod 4, lever 6 and connected valves 1 and 2 is against the compression of resilient spring members 16 and 18. In a specific case, when the spring members 16 and 18 are initially adjusted to balance each other, lever 6 will remain substantially level during its upward travel and valve members 1 and 2 will open by the same amount. Preferably, the total orifice area for the two valves, when open, will be substantially equal to the area of the outlet conduit.

As valves 1 and 2 rise from their respective seats, liquid begins to flow from tanks A and B, not shown, respectively through the illustrated inlet ports into inlet compartments 24 and 26 and thence past valve ports 32 and 34, past valve members 1 and 2, into mixing compartment 14, through the outlet port of mixing compartment 14, to the pump, and toward a discharge valve or point, not shown, therebeyond. With both of the valve members 1 and 2 open equally, the liquids in tanks A and B will be pumped through the proportioning valve means in equal proportions, provided that the relative liquid levels in the respective tanks, and therefore the relative pressure differentials across the valve ports, are the same.

The pressure differentials across the valve ports depend primarily upon factors such as the lift distances from the respective liquid levels to the pump, the properties, e.g., density, viscosity, and the like, of the respective liquids, and the frictional resistances to flow developed by the conduits connecting the proportioning valve and the sources of supply.

As long as the relative pressure differentials across the valve ports remain the same, the proportioning valve means will continue to operate as described above. However, should the relative pressure differentials across the valve ports vary, for any reason, from those existing when the proportioning valve means was preset, the respective liquids will tend to flow through the proportioning valve ports in a different proportion. As previously indicated, a change in the relative pressure differentials can come about through a change in the relative liquid levels, as for example, when one or the other of the component liquids is independently pumped from its supply tank, without a corresponding amount being pumped from the other supply tank. A change in the relative liquid levels can also come about merely through pumping of the blended liquids, when the supply tank volumes and/or shapes are unlike. A change in relative liquid levels can also come about, even when the supply tank volumes and shapes are alike, through pumping the component liquids in unequal volume proportions.

As the pressure differential across one of the valve ports tends to change relative to that across the other valve port, the pressure differential between inlet compartments 24 and 26 will also change a corresponding amount. When the change in pressure differential between inlet compartment 24 and 26 is such that the pressure in inlet compartment 24 becomes greater relative to that in inlet compartment 26, the change in pressure differential will be transmitted to the underside of diaphragm 28 of diaphragm actuator 29, through conduit 30. The increased pressure differential between inlet compartments 24 and 26 will therefore cause diaphragm 28 and the piston rod 31 associated therewith to lift by equal amounts. Similarly as with diaphragm 8, the diaphragm 28 is of an area such that, when acted upon by pressure differentials of a magnitude sufficient to affect adversely the desired flow proportion, the diaphragm 28 will be capable of producing a force sufficient to effect the desired valve movement.

The upward motion of piston rod 31 in turn causes valve member 2 to rise against the compression of spring 18, thus permitting a greater flow of liquid from inlet compartment 26 to mixing compartment 14 than previously. The upward motion of valve member 2 causes a corresponding upward motion in the end of lever 6 to which valve member 2 is attached and a corresponding depression in the other end of lever 6 to which valve member 1 is attached. Depression of valve member 1 restricts its valve port 32 and reduces the flow therethrough by an amount corresponding to the increase in flow permitted through valve port 34 of valve member 2. Accordingly, the first and second valve means are automatically adjusted inversely with respect to the change in pressure differential, and the flow of the component liquids from supply tanks A and B to mixing compartment 14 is adjusted automatically to compensate for the changed pressure differential between the inlet compartments 24 and 26, whereby a constant flow proportion is maintained.

When the change in relative pressure differential between inlet compartments 24 and 26 is in the opposite direction, that is, when the pressure in inlet compartment 24 becomes lower relative to the pressure in inlet compartment 26, the change in pressure differential causes the valve mechanism to function in a manner opposite to that described above. Thus, the relatively higher pressure in compartment 26 acts on the upper side of diaphragm 28 against the relatively lower pressure thereunder transmitted through conduit 30 from inlet compartment 24, to further restrict the effective size of valve port 34 adjacent valve member 2 and to further enlarge the effective size of valve port 32 adjacent valve member 1. Again, the change in effective valve port areas causes a change in the flow proportion corresponding to the change in pressure differential between the inlet compartments, thereby maintaining a constant flow proportion.

When the pump is stopped, the pressure in mixing compartment 14 rises due to atmospheric venting of the column of liquid above the pump, thus permitting piston rod 4 and valve members 1 and 2 to close fully and act as check valves, thereby preventing intermixture of blended and unblended liquids and maintaining prime in the respective inlet compartments and the inlet conduits associated therewith. Incorporation of the check valve function into the proportioning means is especially important in connection with the pumping of volatile liquids, for example, such as modern gasolines. This is true since any given gasoline dispensing system may well be operating with the maximum pump lift possible short of causing vaporization and consequent cavitation during pump operation. In such systems the additional resistance to flow that would be created by the use in the respective supply lines of separate check valves, in addition to the resistance to flow already imparted by the proportioning valve, might increase the resistance to flow to a magnitude sufficient to cause cavitation. Where one of the liquids being pumped is more volatile than the other, vaporization of a part of that liquid only or of a greater part of that liquid than of the other liquid can adversely affect the desired blending proportions.

The relative proportions of the respective liquids can be varied, within the design limits of any particular valve structure, by adjustment of the resilient force on one or both of springs 16 and 18 by means of threaded screw members 20 and 22. Alternatively, or in addition, the relative proportions of the respective liquids can be adjusted by moving diaphragm actuator 11 and associated fulcrum 7 to one side or the other from the center of lever 6.

While the fact that the herein disclosed proportioning device produces a constant proportion of component fluids, notwithstanding independent variation in the pressure differentials across the respective valve ports, has been emphasized in the foregoing description, other important advantages are also achieved. For example, it should be noted that the herein disclosed proportioning device also produces a constant proportion of component fluids not withstanding variations in the total flow volume. Conversely, the device permits a constant total flow volume, notwithstanding variations in the respective pressure differentials across the proportion controlling valve ports.

In Figure 2 there is schematically illustrated a typical gasoline service station dispensing system in which the herein disclosed proportioning valve means can be used to advantage. In the system illustrated two gasolines having higher and lower octane ratings can be dispensed individually from tanks A and B respectively through pumps 50 and 54. Under these circumstances proportioning valve means 24 acts as a check valve preventing backflow of liquid from pump 52 through branch conduits 60 and 62 into the respective manifolding conduits 64 and 66 for tanks A and B. Alternatively, a blend of the gasolines contained in tanks A and B can be dispensed in a fixed, predetermined proportion from pump 52, without regard to the liquid levels in tanks A and B, by operation of proportioning valve 24 in the manner described above. Under these circumstances, backflow from pumps 50 and 54 is prevented by means of check valves 56 and 58.

Although the foregoing proportioning valve means has been specifically described for use in a combination involving a suction pump, it will of course be apparent that said means can be used in other combinations, for example, gravity feed or pressure feed systems, with good results.

In a specific embodiment, a valve structure similar to that shown in Figure 1, except for location of the diaphragm actuators outside of the valve housing, was connected at its inlet ports to a pair of inlet conduits and through these conduits to a pair of supply tanks, A and B, having a capacity respectively of 300 gallons and 550 gallons. In this case the effective piston area of the diaphragm actuators was 2.26 square inches. A standard, commercial gasoline dispensing pump, involving a positive displacement pump provided with pressure responsive bypass means, an air eliminator, a flow meter, a visigauge, and dispensing valve and nozzle, all connected in series, was connected to the outlet port of the valve structure. In a specific test run, tank A contained test liquid (a standard, commercial "regular" grade gasoline) to a depth of 9.75 inches, and tank B contained test liquid to a depth of 20.25 inches. These values corresponded to 65.5 and 220.5 gallons, respectively. The valve structure was preset to deliver equal volumes of test liquid, and pumping was commenced at the rate of approximately 10.9 gallons per minute. Pumping was continued at the same rate for a predetermined test period. At the end of the test period, the liquid levels in tanks A and B were again measured and found to be 3.75 and 16.75 inches, which corresponded to a remainder of 16.4 and 170.5 gallons respectively. The difference in volume before and after the test run was found to be 49.1 gallons for tank A and 50.0 gallons for tank B. The delivered product was therefore a blend of 49.5 volume percent of the test fluid from tank A and 50.5 volume percent of the test fluid from tank B. The apparent deviation from equal volume proportions is considered attributable primarily to difficulty in measuring accurately the liquid volumes in the tanks.

Many modifications of the herein described proportioning valve means will suggest themselves to those skilled in the art. Thus, various valve member and valve port structures, for example gate valves, plug valves, flap valves, rotary valves and the like, can be used in place of the structure illustrated for valve members 1 and 2. As indicated, it is not essential that the diaphragm actuators be disposed within the valve housing, and good results have been obtained by external mounting thereof. Actuators other than those of the bellows diaphragm type illustrated can also be used. For example, good results can be obtained with solenoid actuators. Spring members 16 and 18 can be located beneath instead of above valve members 1 and 2. It will also be apparent that fluids other than gasoline can be blended in a fixed, predetermined proportion with the herein described proportioning valve means. For example, lubricating oil blends, solvent blends, liquid-liquid reactant mixtures, and even gaseous blends can be formed using the herein described proportioning valve means or modifications thereof. Various other changes in form, size, arrangement of parts, operation and mechanical details can be made.

Numerous other modifications of the herein described invention can be resorted to without departing from the spirit or scope thereof. Accordingly, only such limitations should be imposed upon the present invention as are set forth by the claims appended hereto.

We claim:

1. A fluid proportioning valve structure comprising a valve housing containing a mixing compartment and a first and second inlet compartment connected with the mixing compartment, normally closed first and second valve means for controlling flow from the respective inlet compartments into said mixing compartment, means responsive to fluid pressure differential between the mixing compartment and an external fluid pressure source for opening at least one of said valve means independently of the magnitude of the pressure differential between said inlet compartments and said mixing compartment when flow through said structure is commenced, linking means connecting the valve means and adapted to produce concurrent and opposite throttling movement of said valve means, a conduit connecting one of said inlet compartments with pressure responsive means connected to the valve means associated with the other of said inlet compartments, said pressure responsive means being responsive to pressure differential between the inlet compartments and adapted to vary flow from the respective inlet compartments through each of said valve means inversely with the direction of the pressure differential.

2. A fluid proportioning valve structure comprising a valve housing containing a mixing compartment and a first and second inlet compartment connected with the mixing compartment, normally closed first and second valve means for controlling flow from the respective inlet compartments into said mixing compartment, means for adjusting said valve means, a lever connecting said valve means and supported upon an intermediately disposed, vertically movable fulcrum and adapted to produce concurrent and opposite throttling movement of said valve means, means responsive to fluid pressure differential between the mixing compartment and an external fluid pressure source for causing vertical movement of said fulcrum and for concurrently opening the valve means when flow through said structure is commenced, a conduit connecting one of said inlet compartments with pressure responsive means connected to the valve means associated with the other of said inlet compartments, said pressure responsive means being responsive to pressure differential between the inlet compartments and adapted to vary flow from the respective inlet compartments through each of said valve means inversely with the pressure differential.

3. The apparatus of claim 2 wherein said fulcrum is also laterally movable.

4. In combination with the apparatus of claim 2, a discharge conduit connected to the mixing compartment of said fluid proportioning valve structure, a pump operatively associated on its suction side with said discharge conduit, a first and a second supply vessel adapted to contain different fluids, conduits connecting said supply vessels respectively with said first and second inlet compartments of said fluid proportioning valve structure.

5. In combination with the apparatus of claim 2, a first and a second supply vessel adapted to contain different fluids, first and second manifold conduits connected at their inlet ends respectively with said supply vessels, each of said conduits having a pump connected on its suction side with the discharge end, a check valve positioned in each of said manifold conduits between the inlet end and the discharge end, a first and second branch conduit connected at one end to each of said manifold conduits between the inlet end and the check valve, and at the other end with the respective inlet compartments of said fluid proportioning valve structure, a discharge conduit connected to the mixing compartment of said fluid proportioning valve structure, and a pump connected on its suction side to the discharge conduit.

6. A fluid proportioning valve structure comprising a valve housing having incorporated therein a mixing compartment provided with an outlet port, a first and second fluid inlet compartment provided respectively with a first and second inlet port and with a first and second valve port connecting each of said fluid inlet compartments with said mixing compartment, a first and a second valve member adapted to engage the respective valve ports from the discharge side for controlling flow between said inlet compartment and the mixing compartment, a lever connected to said valve members and connecting the same together and adapted to produce concurrent movement in opposite directions of said valve means, said lever being pivotally supported upon a vertically movable fulcrum that is operatively associated with one side of a first diaphragm actuator adapted to control the vertical movement thereof and thereby concurrently to disengage the valve members from the valve ports when flow through said structure is commenced and concurrently to engage said members and valve ports when said flow is stopped, the other side of said diaphragm actuator being connected to the atmosphere so that said diaphragm actuator is responsive to pressure differential between the atmosphere and the mixing compartment, a first and a second resilient spring member associated with the respective valve members and normally tending to urge the valve members into engagement with said valve ports, means for adjusting the reslient force of said spring members, a second diaphragm actuator associated on one side with one of said valve members, a conduit connecting the other side of said second diaphragm actuator with the other of said inlet compartments so that the second diaphragm actuator is responsive to pressure differential between the first and the second inlet compartments and adapted to vary flow from the respective inlet compartments through each of said valve means inversely with the pressure differential.

7. The apparatus of claim 6 including in combination, valve means disposed in said conduit for damping fluid flow therethrough.

8. A fluid proportioning valve structure comprising a valve housing containing a mixing compartment and a first and second inlet compartment connected with the mixing compartment, normally closed first and second valve means for controlling flow from the respective inlet compartments into said mixing compartment, means for opening at least one of said valve means independently of the magnitude of the pressure differential between said inlet compartments and said mixing compartment when flow through said structure is commenced, linking means connecting said valve means and adapted to produce concurrent and opposite throttling movement of said valve means, a conduit connecting one of said inlet compartments with pressure responsive means connected to the valve means associated with the other of said inlet compartments, said pressure responsive means being responsive to pressure differential between the inlet compartments and adapted to vary flow from the respective inlet compartments through each of said valve means inversely with the direction of the pressure differential.

References Cited in the file of this patent

UNITED STATES PATENTS

| | | |
|---|---|---|
| 353,704 | Nash | Dec. 7, 1886 |
| 962,111 | Assman | June 21, 1910 |
| 2,277,314 | Gallagher | Mar. 24, 1942 |

FOREIGN PATENTS

| | | |
|---|---|---|
| 325,753 | Great Britain | Feb. 27, 1930 |